United States Patent
Gummig

(10) Patent No.: US 12,214,880 B2
(45) Date of Patent: Feb. 4, 2025

(54) PASSENGER-ORIENTED PATH ESTIMATION AND DISPLAY

(71) Applicant: Panasonic Avionics Corporation, Irvine, CA (US)

(72) Inventor: Jared Gummig, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 273 days.

(21) Appl. No.: 17/847,969

(22) Filed: Jun. 23, 2022

(65) Prior Publication Data

US 2023/0415895 A1    Dec. 28, 2023

(51) Int. Cl.
G06T 17/05 (2011.01)
B64D 11/00 (2006.01)

(52) U.S. Cl.
CPC ........ B64D 11/00155 (2014.12); G06T 17/05 (2013.01)

(58) Field of Classification Search
None
See application file for complete search history.

(56) References Cited

U.S. PATENT DOCUMENTS 9,541,401 B1    1/2017  Brown et al.
2017/0103571 A1*  4/2017  Beaurepaire ............ G06F 3/011

* cited by examiner

Primary Examiner — Robert J Craddock
(74) Attorney, Agent, or Firm — Perkins Coie LLP

(57) ABSTRACT

Embodiments described herein relate to providing path information of a vehicle to vehicle passengers, and the provided path information may be configured according to passenger-related constraints. In one embodiment, a method for providing passenger-oriented path information via an in-flight entertainment system is described. The method includes making a determination that a graphical display of an estimated first path of the commercial passenger vehicle traveling via a route between an origin and a destination intersects a constrained area. The estimated first path is estimated as a straight-line path between consecutive waypoints along the route. The method further includes, based on the determination that the estimated first path intersects the constrained area, determining a second path for display that does not intersect the constrained area. The method further includes causing a display of the second path on an IFE display associated with a passenger.

20 Claims, 10 Drawing Sheets

PASSENGER-ORIENTED PATH ESTIMATION AND DISPLAY

TECHNICAL FIELD

This document is related to providing and displaying vehicle path information to passengers on a commercial passenger vehicle.

BACKGROUND

Commercial travel has evolved to provide entertainment options to passengers traveling to their destinations. For example, in an airplane or train, entertainment options are provided on monitors located on the back of seats, where passengers can watch movies or television shows via the monitors as they travel to their destinations. Passenger vehicles have also begun to provide connectivity tools that may provide additional opportunities to passengers for entertainment. Beyond entertainment, however, there exists a need to provide relevant and informative information to passengers.

SUMMARY

The present document provides various techniques for curating flight information for passenger viewing, such as flight paths. According to various embodiments, estimated flight paths for passenger viewing are further configured to reflect certain aspects of an actual route followed by a vehicle to enhance passenger understanding of the actual route. For example, a true route followed by a vehicle may avoid certain constrained areas or zones such as bad weather areas, national security areas, flying embargo zones, and so on. In various embodiments, an estimated flight path used to display a flight route to passengers is presented to reflect the avoidance of such constrained areas. Thus, technical benefits are provided through the presentation of such information, for example, as passenger concerns that the aircraft may be flying over a no-fly zone are alleviated.

In one example aspect, a method for providing flight information implemented in an in-flight entertainment (IFE) system of a commercial passenger vehicle is disclosed. The method includes making a determination that a graphical display of an estimated first path of the commercial passenger vehicle traveling via a route between an origin and a destination intersects a constrained area. The estimated first path is estimated as a straight-line path between consecutive waypoints along the route. The method further includes determining, based on the determination that the estimated first path intersects the constrained area, a second path for display that does not intersect the constrained area. The method further includes causing a display of the second path on an IFE display associated with a passenger.

In another aspect, a system is disclosed. The system includes a processor configured to implement a method described in the present document. The system may include a memory storing instructions that, when executed by the processor, cause the system to perform a method described in the present document.

In yet another aspect, a computer readable medium is disclosed. The computer readable medium stores processor-executable program code that, upon execution by one or more processors, causes implementation of a method described in the present document.

These, and other aspects are disclosed throughout the present document.

DETAILED DESCRIPTION

1. Introduction

Among the many advancements in aircraft technology, improvements in passenger experience have received much attention. Air travel typically involves journeys over extended distances that at the very least take several hours to complete, so airlines provide onboard in-flight entertainment (IFE) and communications (IFEC) systems that offer a wide variety of multimedia content for passenger consumption. For example, IFEC systems may offer recently released movies and television shows such as news programs, situation and stand-up comedies, documentaries, and so on for passenger viewing. As another example, IFEC systems may offer audio-only programming, video-only content, video games, or the like.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

To further enhance passenger experience, useful and informative information may need to be provided to passengers via IFEC systems; for example, passengers may be interested in useful information related to the journey and/or the destination. It is then desirable to obtain and provide such information to the passengers. Generally, it may also be desirable to provide generalized, estimated, and/or limited information to passengers to reduce data storage and processing needs, to reduce communication channel occupancy when obtaining data, and to provide security and reduce widespread distribution of sensitive information. Thus, in some examples, a vehicle path may be estimated as a straight-line path between an origin and a destination, or one or more straight-line paths between a limited number of waypoints. For example, a path of an aircraft may be estimated and displayed as a great circle arc spanning between an origin airport and a destination airport, and with the great circle arc, passengers of the aircraft can generally ascertain the route travelled by the aircraft.

Figure 1A:
FIG. 1A shows demonstrates technical challenges related to providing path information for display to passengers of a vehicle.

FIG. 1A illustrates an example of estimation of a vehicle path as a straight-line path. In particular, FIG. 1A illustrates a route 10 for a vehicle to travel from an origin to a destination. As appreciated, the route 10 may be developed by vehicle operators based on numerous factors and may feature various complexities. The illustrated example of the route 10 includes various waypoints through which vehicle operators may cause the vehicle to travel. Due at least to technical constraints and passenger constraints (e.g., readability, simplicity), the route 10 and its complexities may be estimated as a straight-line path between the origin and the destination, as shown by path estimation In some examples, the path estimation 20 may include one or more straight-line paths between a subset of the total number of waypoints of the route 10.

But, the desire to provide generalized, estimated, and/or limited information to passengers may result in inaccurate representation of flight information and misinterpretation by passengers, in some examples. Notably, estimated vehicle paths that feature straight-line paths between waypoints (e.g., a subset of all waypoints by which the vehicle navigates) may inaccurately represent a route for the vehicle that passes through or near certain areas and locations due to some level of abstraction or estimation. For example, a great circle arc or a flight path estimation that spans directly between an origin and a destination may indicate to a passenger that an aircraft passes over a certain area or zone, when in reality, the aircraft may travel along a route that circumvents the certain area or zone. For example, FIG. 1A shows that the path estimation 20 passes through a keep out zone and this intersection can be characterized as an artifact of the estimation, since the route 10 does not pass through the keep out zone 50. Thus, straight-line approximations and interpolations of a route may lead to inaccurate representations of the route 10.

Indeed, a level of estimation or abstraction in flight information provided to passengers of a vehicle presents various technical challenges, as a likelihood that passengers may misinterpret and misconstrue the provided flight information is significant, leading to expressed concerns and negative reactions from passengers. Undesired consequences and technical challenges, including increased communication bandwidth occupancy as passengers relay and communicate concerns to vehicle operators based on inaccurate representations of estimated/abstracted flight information, arise, in some examples.

Such consequences may stem from pre-determined passenger concerns, knowledge, or biases associated the certain areas or zones that are inaccurately represented as part of a vehicle's route or path. In an example application of embodiments described herein, estimated flight paths provided to passengers may inaccurately represent the vehicle as passing over or through a conflict area, or an area subject to warring or violence, which leads to passengers expressing concerns related to safety that may be unwarranted and unnecessary (as the true path taken by the vehicle may circumvent the conflict area). In another applicable use cases of embodiments described herein, an estimated vehicle path provided to passengers may induce passenger anxiety or phobia due to the estimated vehicle path approaching or being near certain locations such as congested roadways, areas perceived to be dangerous, areas associated with negative emotions of a passengers (e.g., liquor stores for alcoholic passengers), or the like.

Thus, various embodiments described herein address technical challenges through providing and displaying estimated path information that is curated at least in part for passenger viewing. For example, in some embodiments, estimated path information is configured to indicate an estimated path that circumvents or does not intersect with certain constrained areas or zones. Accordingly, path estimations are augmented beyond a level of estimation or abstraction to represent paths that are expected to not induce negative consequences related to passenger misinterpretations and concerns.

In some embodiments, an IFEC system may obtain information that defines constrained areas to be avoided in path estimations. These constrained areas include areas that have been determined to be associated with negative and disruptive passenger emotions, including fear, anxiety, and concern. For example, constrained areas can include conflict areas and warzones, areas related to the distribution of vices (e.g., alcohol), areas known to be congested with vehicular traffic, areas with active weather events, or the like. The IFEC system may communicate with one or more ground servers to obtain the information for constrained areas, which may be managed and stored in a database.

In some embodiments, the IFEC system may obtain flight, navigation, or path information from ground servers or from other systems onboard the vehicle, such as an avionics or navigation system. From the obtained flight, navigation, or path information and with the information that defines constrained areas, the IFEC system is configured, in accordance with various embodiments described herein, to determine a path for display that does not intersect the constrained areas defined in the information. Thus, advantageously, the IFEC system may provide passenger-oriented path information, or path information expected to not induce negative passenger reactions.

2. Exemplary Computing System and IFEC Deployments

Figure 1B:
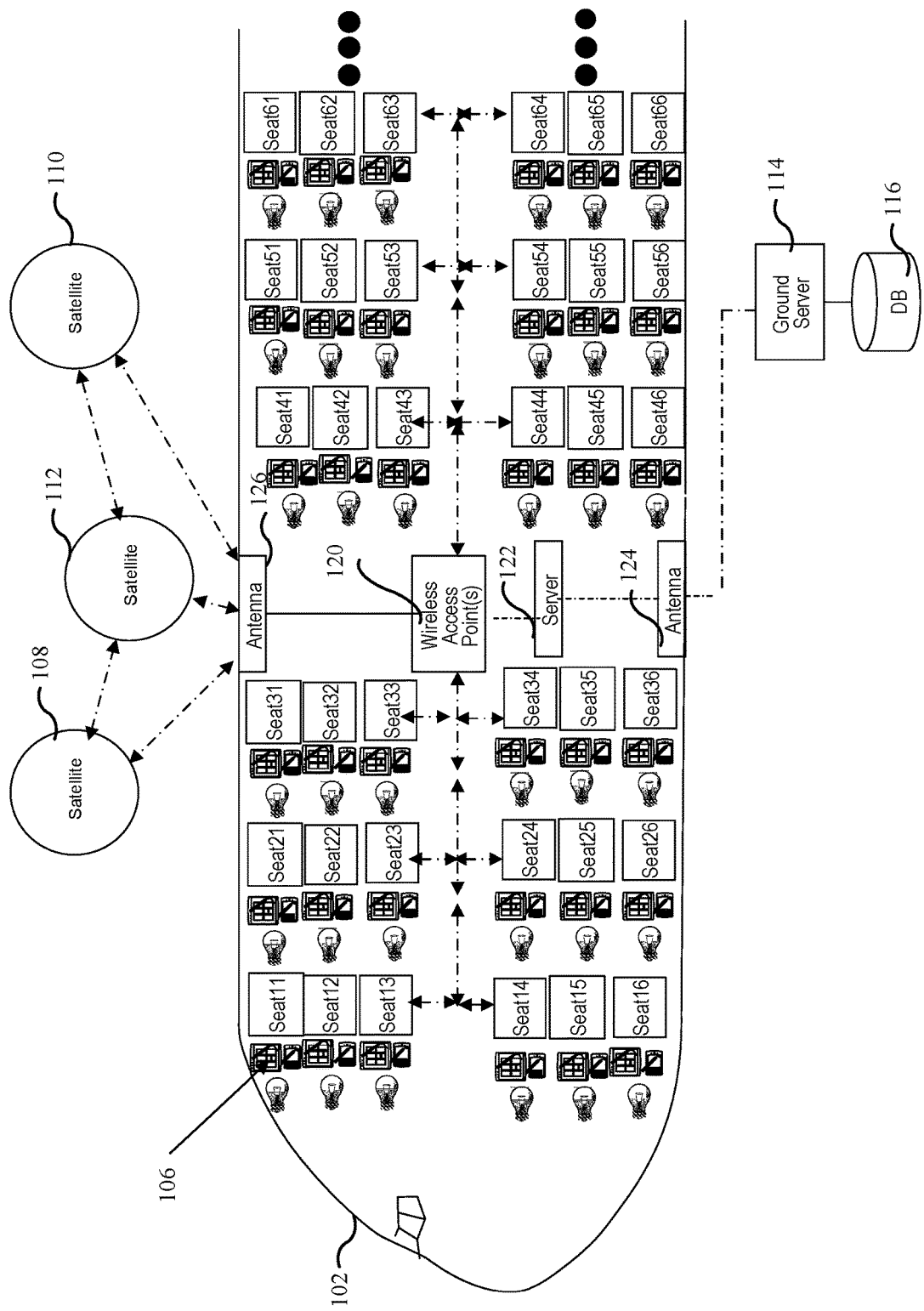
FIG. 1B shows an exemplary passenger vehicle that includes an in-flight entertainment and communication (IFEC) installation.

FIG. 1B shows an example system in which the various methods embodiments described in the present document may be implemented. An airplane 102 is depicted to include multiple passenger seats, Seat 11 to Seat 66. The airplane 102 may include an antenna 126 that is configured to communicate with external communication sources such as a satellite network that includes one or more satellites 108, 110, 112. Satellite communication may be used for both downloading information and uploading information. Wi-Fi at airport gate(s) and cell-phone modem through a cellular communication station (e.g., a cell tower) may be used to both downloading information and uploading information from/to ground server 114 through the Internet and from/to database 116. For example, any one or more of satellite communication, Wi-Fi, or cellular communication may be used to download flight information (e.g., waypoints, destination information) or information related to constrained areas (e.g., map overlay data defining polygons that represent areas expected to induce negative passenger reaction).

The airplane 102 may include an onboard server 122, one or more wireless access points 120 and an antenna 124 that is configured for communication with a ground server 114 that includes a database 116.

In some examples, sensor data may be collected on the airplane 102 according to a pre-determined manner, such as a script. For example, such a script may include a list of entries that show zones where sensor data, e.g., raw intrinsic data, raw extrinsic data, raw global data, is collected and ordered. For example, data may be collected from seats 11, 31, 14, 34 first, followed by seats 34, 16, 36, 13 and 33, and so on. Corresponding to each entry, there may be an onboard electronic device on passengers may be alerted for collecting sensor data from a sensor network, for example, including Seatback Display (illustrated by screen icon), Passenger PED (illustrated by and Overhead Lighting (illustrated by light bulb icon).

Continuing with FIG. 1B, in some embodiments, passengers, individual passenger(s), and/or group(s) of passengers, and/or airline personnel can each by presented with estimated flight or path information via a corresponding IFE display 106 (e.g., a Seatback Display). In some embodiments, IFE display 106 as shown in FIG. 1B are communicatively coupled with one or more computing entities, such as the server 122, that implement various embodiments described herein to provide estimated passenger-oriented path information via IFE displays 106. In some embodiments, an IFE display 106 is integrated with a computing entity, and each computing entity integrated with a plurality of IFE displays 106 may implement various embodiments described herein to provide estimated passenger-oriented path information, or paths for display that do not intersect with constrained areas related to negative passenger reactions. In some embodiments, the IFE displays 106 for passengers are coupled (e.g., wired, wireless) with one or more servers 122 that provide display information to each IFE display 106. For example, a server 122 may embody a computing entity that integrates various embodiments described herein to determine paths for display that avoid constrained areas that are expected to induce negative passenger reactions.

In some embodiments, a passenger may operate one or more personal devices (e.g., smartphones, laptops, tablets, communication devices, entertainment devices) while onboard the vehicle, and the personal devices of a passenger may be connected to the IFEC system. Accordingly, in some embodiments, passenger-oriented path information may be provided to passengers via personal devices. In some embodiments, an IFE display 106 for a passenger may be or may include a seatback display device, a retractable display device, a wall or ceiling mounted display device, passenger entertainment devices (PEDs) (e.g., mobile communication devices, tablets, laptops, etc.).

Figure 2:
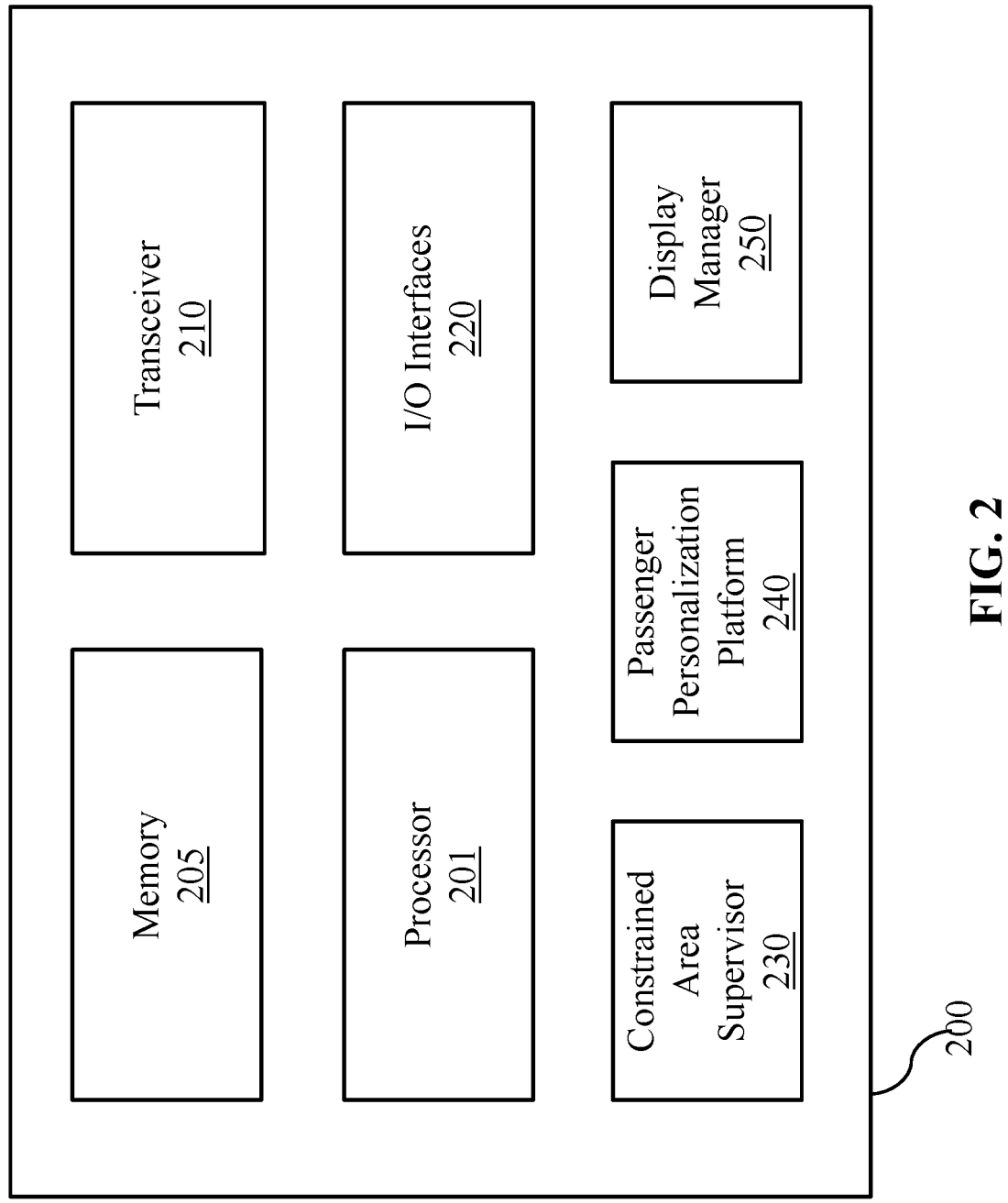
FIG. 2 is a block diagram of a device on which embodiments described herein may be implemented.

FIG. 2 provides a diagram illustrating an example computing entity or device 200 that implements various embodiments described herein. For example, in some embodiments, the device 200 is configured to perform operations that relate to obtaining information that defines constrained areas, determining that an estimated first path intersects a constrained area, determining a second path for display that does not intersect the constrained area, and causing display of the second path via an IFE display (e.g., a Seatback Display illustrated in FIG. 1B) associated with a passenger. In some embodiments, the device 200 is embodied by an entertainment system (IFEC system), an in-vehicle server (e.g., server 122), a device integrated with passenger displays (e.g., Seatback Displays), a ground server, a navigation system of the vehicle, and/or the like.

In FIG. 2, the device 200 includes at least one processor 201 and a memory 205 having instructions stored thereupon. The memory 205 may store instructions to be executed by the processor 201. In other embodiments, additional, fewer, and/or different elements may be used to configure the device 200. The memory 205 is an electronic holding place or storage for information or instructions so that the information or instructions can be accessed by the processor 201. The memory 205 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 201 configure the device 200 to perform the example operations described in this patent document. The instructions executed by the processor 201 may be carried out by a special purpose computer, logic circuits, or hardware circuits. The processor 201 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 201 can perform the operations called for by that instruction. The processor 201 operably couples with the memory 205 and transceiver 210 to receive, to send, and to process information and to control the operations of the device 200. The processor 201 may retrieve a set of instructions from a permanent memory device such as a ROM device and copy the instructions in an executable form to a temporary memory device that is generally some form of RAM. In some implementations, the device 200 can include a plurality of processors that use the same or a different processing technology.

The transceiver 210 transmits and receives information or data to another device (e.g., a ground server, other servers, satellites, or the like). The transceiver 210 may be comprised of a transmitter and a receiver; in some embodiments, the device 200 comprises a transmitter and a receiver that are separate from another but functionally form a transceiver. The I/O interfaces 220 enable data to be provided to the device 200 as input and enable the device 200 to provide data as output. In some embodiments, the I/O interfaces 200 may enable user input to be obtained and received by the device 200 (e.g., via a touch-screen display, via buttons or switches) and may enable the device 200 to display information, including determined paths or path estimations that do not intersect with constrained areas. In some embodiments, devices including touch-screen displays, buttons, controllers, audio speakers, or the like are connected to the device 200 via I/O interfaces 220.

As shown in FIG. 2, the device 200, embodied by an entertainment system (e.g., an IFEC system), includes a constrained area supervisor 230 and a passenger personalization platform 240 to implement various embodiments described herein. In some embodiments, the constrained area supervisor 230 is configured to initiate and regulate paths that are displayed for passengers and to, upon determining that a path intersects with a constrained area, determine another path for display that does not intersect with a constrained area.

In doing so, the constrained area supervisor 230 cooperates with the passenger personalization platform 240. In particular, the constrained area supervisor 230 cooperates with the passenger personalization platform 240 to determine intersection of paths with constrained areas, in some embodiments. For example, the passenger personalization platform 240 obtains and provides, to the constrained area supervisor 230, information defining constrained areas that are relevant to one, some, or all passengers of the vehicle. In at least this way, the passenger personalization platform 240 enables personalization of path displays to passengers of the vehicle.

In some embodiments, the passenger personalization platform 240 is configured to access, store, and/or manage passenger profiles for passengers of the vehicle, and a passenger profile for the passenger may include passenger-specific information including media content preferences, demographic information, connecting flight or itinerary information, historically relevant constrained areas, constrained areas that are relevant to the passenger based on attributes of the passenger, and/or the like. Thus, via passenger profiles for passengers of the vehicle, the passenger personalization platform 240 can identify individually-relevant constrained areas for the constrained area supervisor 230. In some embodiments, the passenger personalization platform 240 obtains a passenger manifest that identifies each passenger of the vehicle from the ground server, and based on the passenger manifest, the passenger personalization platform 240 loads passenger profiles for each passenger. In some embodiments, the passenger personalization platform 240 is configured for other functionality, including curating media content for individual passengers and displaying personalized itinerary information for individual passengers.

Different paths can be determined by the constrained area supervisor 230 for display to different passengers according to different constrained areas being relevant to the different passengers, as informed by the passenger personalization platform 240. In some embodiments, the passenger personalization platform 240 maintains a default set of constrained areas determined to relevant to a wide spectrum of passengers, and display of paths for passengers (either all passengers or passengers that do not have any specific preferences) may be configured according to the default set of constrained areas. In some embodiments, the passenger personalization platform 240 shares a set of constrained areas to the constrained area supervisor 230 based on a present flight of the vehicle; for example, the passenger personalization platform 240 determines a subset of constrained areas that are relevant to (e.g., within a predetermined range of) the present flight and its origin and destination.

In some embodiments, the constrained area supervisor 230 and the passenger personalization platform 240 cooperate and communicate with each other via one or more interfaces, which may be configured for wired or wireless communication. Via the interfaces, the constrained area supervisor 230 may output a path, and the passenger personalization platform 240 may obtain the output of the constrained area supervisor 230 and cause the graphical display thereof. In some embodiments, the passenger personalization platform 240 cooperates with the constrained area supervisor 230 to cause display of a path specifically curated for a particular passenger; for example, the passenger personalization platform 240 causes graphical display of a path—the path being (i) output by the constrained area supervisor 230 and (ii) configured by the constrained area supervisor 230 to not intersect with constrained areas relevant to a particular passenger—on a particular display device associated with the particular passenger. In some embodiments, the passenger personalization platform 240 stores and manages relationships between passengers and constrained areas, and display devices and passengers.

The device 200 may further include a display manager 250 that is configured to cooperate with at least the constrained area supervisor 230 and the passenger personalization platform 240 to provide the technical benefits and improvements described herein. In some embodiments, the display manager 250 is configured to perform graphics buffer management operations to efficiently cause display of certain information, including path estimations determined by the constrained area supervisor 230 and/or the passenger personalization platform 240, of display devices associated with passengers. The display manager 250 may be configured to cause display of an indication along a path determined by the constrained area supervisor 230 and/or the passenger personalization platform 240 that is representative of the current location of the vehicle along the route, and in some embodiments, the display manager 250 uses a graphics buffer of an IFE display to continuously cause and update display of the indication representative of the current location of the vehicle. For example, using a graphics buffer for an IFE display, the display manager 250 causes display of a first layer of map image data and a second layer of the indication that is representative of the current location of the vehicle. In some embodiments, the display manager 250 may be connected to a plurality of display devices via a path display interface via which graphical display data is provided to the plurality of display devices. Via the path display interface, different layers of data can be provided to display devices, and the different layers of data may include data or information provided to the display manager 250 by a constrained area supervisor 230 or a passenger personalization platform 240.

In some embodiments, the path determined by the constrained area supervisor 230 or the passenger personalization platform 240 to not intersect with a constrained area is included with and is displayed with in the first layer with the map image data. In other embodiments, the path determined by the constrained area supervisor 230 or the passenger personalization platform 240 may be repeatedly evaluated and updated, and is included in the second layer for display. In some embodiments, the display manager 250 causes display of the path determined by the constrained area supervisor 230 or the passenger personalization platform 240 with either the first layer or the second layer based on a flag, metadata, or the like that indicates whether the path will be updated or reevaluated. For instance, for a vehicle traveling along a route with a relatively high number of constrained areas located in the vicinity, the constrained area supervisor 230 or the passenger personalization platform 240 may repeatedly and periodically perform example operations described herein to determine a path that does not intersect with a constrained area, and accordingly, the display manager 250 may cause display of determined paths in the second layer. As another example, a constrained area, such as a severe weather event, may move locations, and the constrained area supervisor 230 or the passenger personalization platform 240 may determine a path that does not intersect the constrained area periodically as the constrained area moves. As such, the display manager 250 may cause display of the determined paths in the second layer. By causing display of volatile or dynamic information in a second layer different from a first layer for which map image data is displayed (e.g., a base map layer displaying a spherical map), the display manager 250 provides technical benefits including improved display latency, as an amount of graphics objects that need to be refreshed or updated is minimized.

Thus, in embodiments described herein, an entertainment system (e.g., IFEC system) embodying the device 200 may include a constrained area supervisor 230, a passenger personalization platform 240, and a display manager 250 that are each configured to perform various operations described herein. While certain operations may be described herein with respect to one of the constrained area supervisor 230, the passenger personalization platform 240, or the display manager 250, it will be understood that the operations and functionality described in this document may be implemented and performed by any one or combination of the constrained area supervisor 230, the passenger personalization platform 240, or the display manager 250 according to the embodiment.

Returning to FIG. 1B, the antenna 124 may be used for communication between the ground server 114 and the server 122. The ground server 114 may provide the server 122 with flight or path information, such as a plurality of waypoints, prior to the departure of the flight. The ground server 114 may also provide additional information about constrained areas that a planned path for the vehicle avoids, that is associated with negative passenger reactions, and/or that is to be used for determining passenger-oriented path estimations.

Figure 3:
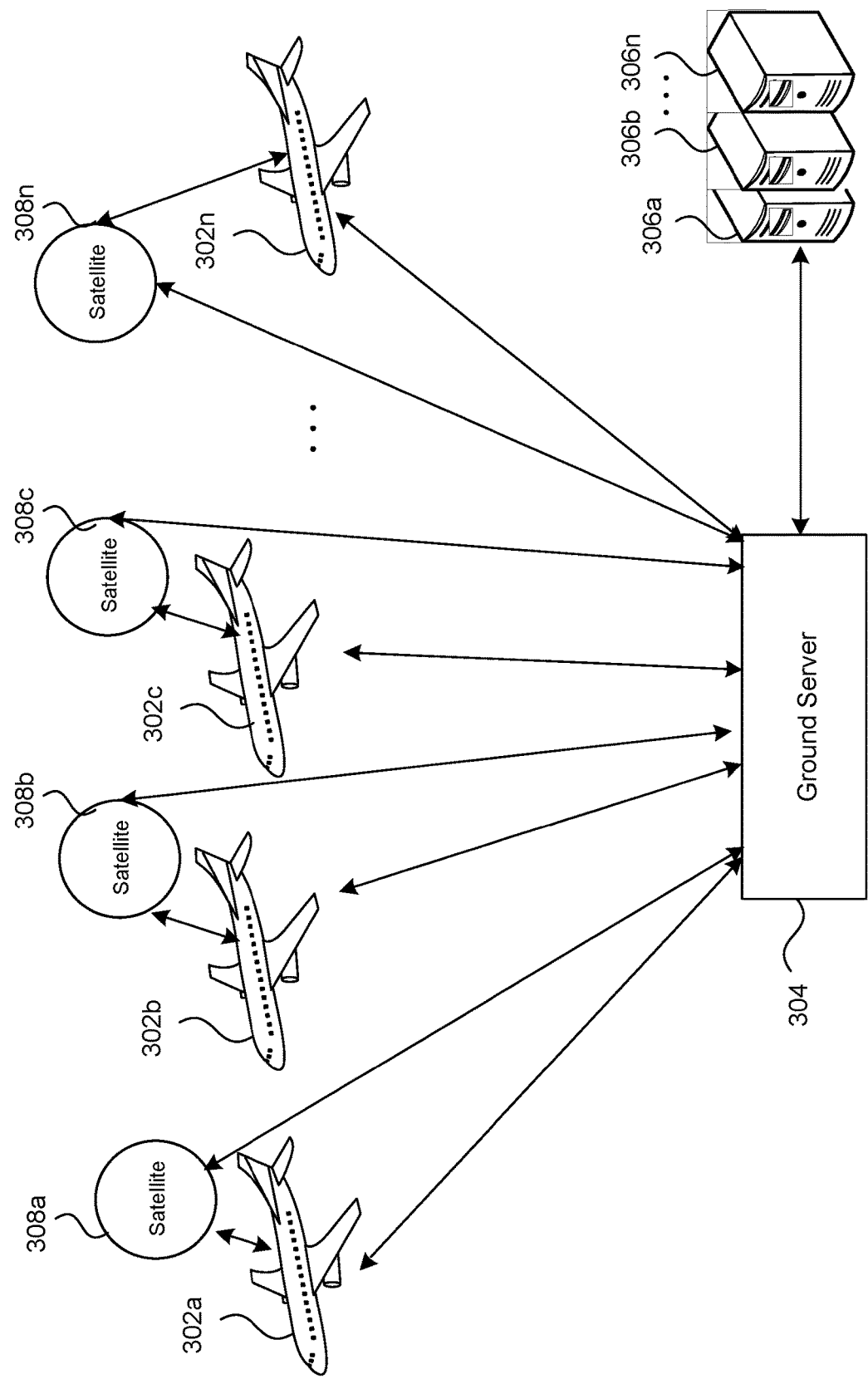
FIG. 3 shows a vehicle network for passenger-oriented display of path information for a vehicle.

FIG. 3 shows an exemplary system for data gathering, processing, and displaying. In particular, FIG. 3 shows a communication network in which flight path information, flight information, and information relating to constrained areas may be collected and communicated to airplanes. For example, in accordance with various embodiments described herein, an IFEC system on-board an airplane may require information relating to a planned flight path for the airplane, information relating to other flights planned for the airplane or other flights connected to a destination for the airplane, and information relating to constrained areas associated with negative passenger reactions in order to provide (e.g., display) passenger-oriented flight information to passengers of the airplane.

A ground server 304 (which may operate similarly to the ground server 114) may be configured to communicate with airplanes 302a, 302b, . . . 302n either via a direct communication link or through a satellite connection using satellites 308a, 308b, 308c, . . . 308n. In some embodiments, databases 306a, 306b, . . . 306n may include a database storing planned flight paths defined by a plurality of waypoints for each of the airplanes 302a, 302b, . . . 302n; a database storing map coordinates corresponding to a plurality of waypoints (e.g., latitude, longitude, and/or elevation coordinates for a waypoint); a database storing flight schedules for airports and hubs; and a database storing map data defining constrained areas or zones, or areas expected to induce negative passenger reactions.

The ground server 304 may communicate information including the flight plan information and the constrained area information to an airplane 302 prior to take off. This information may be used by a server on the airplane 302 to provide passenger-oriented flight information to passengers during, for example, pre-flight, in-flight, and end-flight stages. In some embodiments, the data gathering, processing and displaying system depicted in FIG. 3 may include equipment that provides wireless communication connectivity between the airplane equipment and ground based server via equipment such as a Wi-Fi access point at the gate, or via a cellular communication equipment such as a cell phone tower that may be available to the airplane at the airport or near gate area. In some examples, the Wi-Fi and cellular connectivity may also be available to some airplanes during flight.

Figure 4:
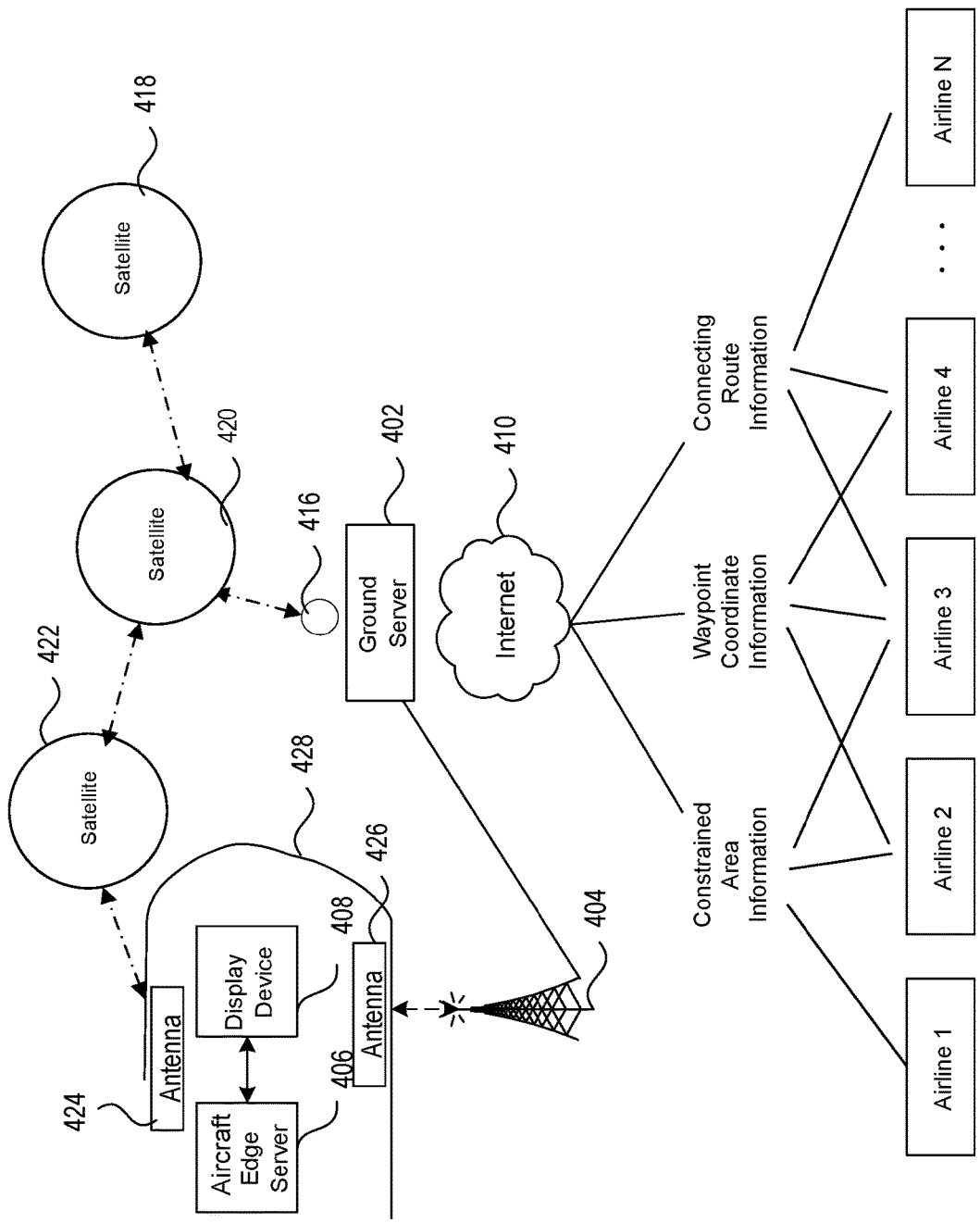
FIG. 4 shows an example of an in-flight entertainment network for passenger-oriented display of path information for a vehicle.

FIG. 4 shows another configuration of a system in which a ground server 402 may use information from multiple flights of multiple airlines (Airline 1, Airline 2 . . . Airline N). For example, as illustrated, the system may obtain constrained area information from multiple flights of multiple airlines. In some embodiments, user input may be collected on multiple flights to identify areas associated with negative passenger reactions, and the user input may be shared between multiple airlines and flights as constrained area information. The system may also obtain waypoint coordinate information from multiple flights of multiple airlines. For example, a particular flight involving a series of certain waypoints may share coordinates and other navigational information related to the certain waypoints to other flights that also involve the certain waypoints. Connecting route information may further be shared between multiple airlines to form a complete picture of possible routes that connect with a destination of a given flight.

Various collected information may be collected and stored at the ground server 402, possibly via communication through the internet 410, in some embodiments. The ground server 402 may communicate the information via a satellite dish 416 with a network of satellites (418, 420, 422), which in turn is received in an airplane via antenna 424 by an onboard server (called edge server 406). The edge server 406 may implement various embodiments described herein, to provide passenger-oriented flight information via displays onboard the airplane 428. Alternatively, or in addition, the ground server 402 may communicate the information to the edge server 406 through a terrestrial connection such as through cellular communication via a cellular network 404 to a cellular reception antenna 426 onboard the airplane. The ground server 402 may be used, for example, to collect and distribute information that defines map overlay polygons for constrained areas associated with negative passenger reactions, such that the information may be relayed to an edge server 406 and used to determine and display passenger-oriented flight information. In some embodiments, the connectivity between the ground server 402 and airplane equipment may be based on a local area wireless network (e.g., a Wi-Fi access point) or a cellular communication network (e.g., cell tower 404) which may be available to the IFEC for communication while during a flight or when parked at an airport terminal, near the gate area.

As illustrated in FIG. 4, the edge server 406 may be in communication with one or more display devices 408, which may include seatback display devices, passenger personal devices, cabin/public display devices, or the like. The edge server 406 may communicate display data to the display devices 408 and instructions to cause display of the display data at the display devices 408. The edge server 406 may be connected with the display devices 408 via wireless connection or via wired connections.

3. Onboard Server Deployment Examples

An IFEC installation may include an onboard server that may be implemented in the form of one or more hardware platforms that include one or more processors, one or more computer memories and network interface for digital data communications. The onboard server may be configured to provide various instructions and content to the seatback displays, the wireless access points, Bluetooth transceivers and collect sensor data from the various onboard sensors. The onboard sensor may also be configured to communicate with a ground server or another server across the internet or a computing cloud for exchanging information related to planned paths for the vehicle, path estimations for passenger display, constrained areas to avoid in path estimation, and so on. The onboard server may perform such communication in real-time (e.g., using the example satellite communication paths depicted in FIGS. 1, 3, and 4) or offline such as communicating with the ground sever at the beginning and/or end of a travel segment. Various technical solutions described herein may be implemented by the onboard server. For example, the ground server may determine that an estimated first path intersects with a constrained area and may accordingly determine a second path for display that does not intersect with a constrained area. The ground server may cause the second path for display to be stored on-board the vehicle (e.g., on server 122) such that the second path for display may be displayed while the vehicle is in travel.

In some embodiments, a vehicle may include multiple systems including an IFEC system that communicate and interact with each other. For example, an aircraft may include an avionics and navigation system that is used for operation of the aircraft and a separate IFEC system that is used for providing entertainment and information to passengers of the aircraft. Accordingly, in such examples, the IFEC system may be configured to communicate with other systems. In an example embodiment, an avionics and navigation system may provide flight path information to an IFEC system, which may then determine passenger-oriented path estimates for display to the passengers. In another example embodiment, an avionics and navigation system may provide limited flight path information (e.g., for security compliance, for communication bandwidth limits, for processing limits) to an IFEC system which may determine path estimates for display using the limited flight path information. In some embodiments, the IFEC system may communicate with the avionics and navigation system of an aircraft, such as to indicate a determination that an estimated path intersects with a constrained area and to request verification that a true path by which the aircraft is navigation does not intersect with the constrained area (e.g., that the determination that the estimated path intersects with the constrained area is based on a level of estimation or abstraction of the estimated path). In this way, in some embodiments, the IFEC system may serve as a back-up or verification system for other systems of a vehicle, by determining and verifying that the vehicle avoids certain areas or zones.

4. Ground Server Embodiment Examples

Similar to the server systems onboard the aircraft described above, the ground server is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for sensor data collection and processing according to the embodiments disclosed herein. The ground server may store information related to a flight or path that is planned for the vehicle; for example, the ground server may store a plurality of waypoints. The ground server may store information related to constrained areas that are expected to induce negative passenger reactions. The ground server may further store information that may indicate demographics, preferences, or other information that is specific to passengers on the vehicle. In some embodiments, the ground server obtains information from one or more databases. Various technical solutions described herein may be implemented at the ground server and/or be controlled by a control from the ground server. For example, the ground server may determine that an estimated first path intersects with a constrained area and may accordingly determine a second path for display that does not intersect with a constrained area. The ground server may cause the second path for display to be stored on-board the vehicle (e.g., on server 122) such that the second path for display may be displayed while the vehicle is in travel.

5. Example Embodiments and Solutions

As described, embodiments described herein provide methods, systems, computer-readable media, and the like for providing passenger-oriented path information to passengers of a vehicle, or providing path information that is configured according to passenger-specific or passenger-relevant constraints and information. In particular, embodiments provide for display of vehicle paths to passengers in a manner that minimizes inducement of negative passenger reactions. In some embodiments, paths of a vehicle are estimated to a level of abstraction, and estimated paths are configured to avoid (e.g., circumvent) certain areas or zones to which passengers are expected to negatively react.

Figure 5:
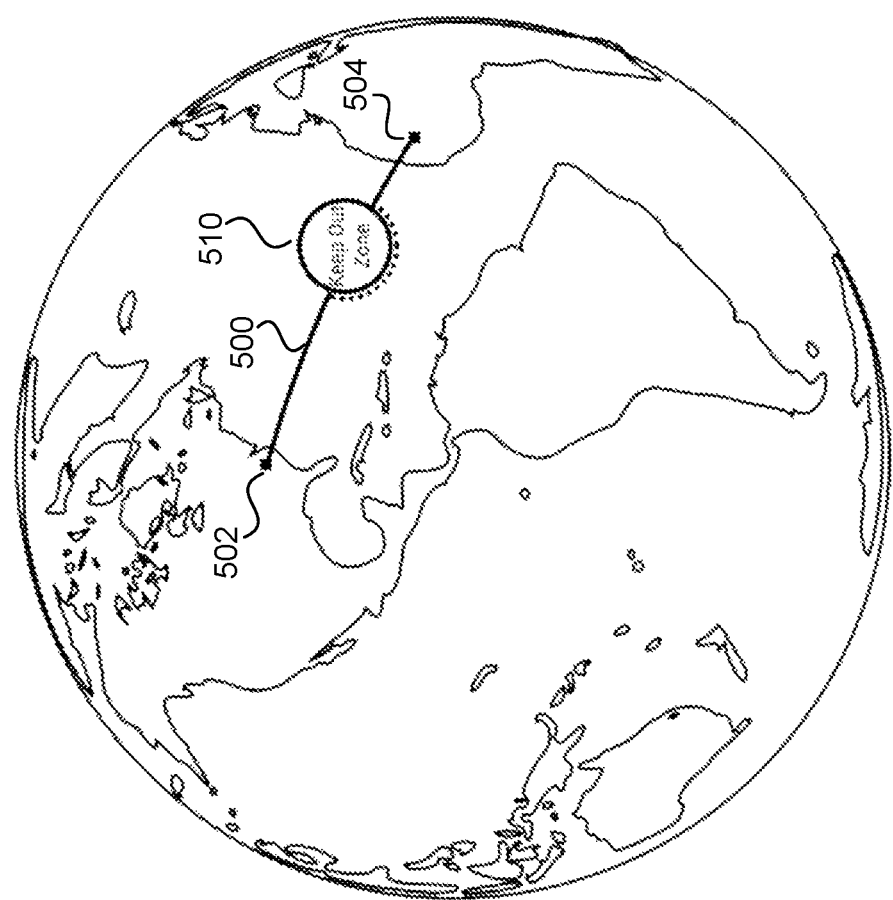
FIG. 5 shows an example of path information that is configured for passenger-oriented display.

FIG. 5 provides an example passenger-oriented path information that may be displayed via an IFE display associated with a passenger in accordance with various embodiments described herein. Passenger-oriented path information, such as that exemplified by FIG. 5, is configured to represent a route travelled by a vehicle with improved accuracy as compared to the path estimation shown in FIG. 1A, or other straight-line approximations or interpolations. The passenger-oriented path information illustrated in FIG. 5 includes a path 500 that spans between an origin 502 and a destination 504, thereby approximately indicating a route, flight, mission, or the like of a vehicle. As shown, path 500 is shown overlaid a spherical map that may be projected onto an IFE display device (e.g., a Seatback Display), and at least a portion of the path 500 may be a great circle arc across the spherical map. A great circle arc may refer a segment of the shortest length that spans between two surface points of a sphere and may appear as an arc (instead of a line) on a two-dimensional projection or representation of a spherical map.

In some embodiments, an IFE system is configured to display path estimations that include or that are in the form of great circle arcs due to various limitations. For example, an IFE system may be limited with respect to its processing capabilities, data storage, or display resolution, and for at least this reason, an IFE system may be configured to display a path estimation that is a great circle arc between an origin and a destination. For example, an IFE system may be provided with information, such as coordinates, for the origin and the destination for a vehicle, and in some examples, the IFE system may not have access to detailed or highly resolved waypoints between the origin and the destination. In other examples, an IFE system may be provided with a limited number of waypoints (including the origin and the destination) for the display of path estimations, with the limited number of waypoints being a subset of a total number of waypoints that are included in a planned route for the vehicle.

In the illustrated example of FIG. 5, a path estimation that is a great circle arc between the origin 502 and the origin 504 intersects with a constrained area 510 (e.g., labelled "Keep Out Zone"). In some embodiments, constrained areas 510 may be defined as closed polygons that overlay a map (e.g., the spherical map shown in FIG. 5). Each closed polygon may define a border of a constrained area, indicating that points within the closed polygon are located in the constrained area. A closed polygon may surround the border of a constrained area by a margin; for example, a closed polygon for map that indicates a constrained area may have a diameter greater than a diameter of the constrained area by a margin.

In some embodiments, constrained areas are defined in map data that may include coordinates or points that construct closed polygons, metadata or labels that identify the constrained areas, a time that an area may be construed as a constrained area, an indication of a demographic or a cohort of passengers relevant to the constrained area, and/or the like. For example, a constrained area may be defined in map data by a center point and a radius that defines a circular area, two foci and axis lengths that define an elliptical area, or three or more points that define a polygon.

In some embodiments, a constrained area is defined based on being associated with negative passenger reactions, or based on being expected or predicted to cause negative passenger reactions. For example, a constrained area may be a warzone or a conflict area that is expected to cause widespread concern from passengers if an indication that the vehicle was located within the constrained area was display, As another example, a constrained area may be an area associated with a traumatic experience or history for a certain passenger or a certain group of passengers, such as an area where a certain passenger was previously robbed or assaulted or a location of an institution where the certain passenger was institutionalized. As a further example, a constrained area may be a location associated with a historical event with negative connotations, such as a location of a significant and publicized aircraft crash, a location of a significant train accident, and/or the like. As yet another example, a constrained area may be a location of a negatively-connotated institution or entity, such as a cemetery, a mental institution, a jail or prison, a rehab facility, an alcohol store, and/or the like. In some examples, certain constrained areas may be more relevant to certain passengers and may not be relevant to other passengers, and information that defines a constrained area may include an indication of a group of passengers to whom the constrained area is expected to be relevant.

Information that defines a plurality of constrained areas may be obtained from a database that stores and manages information related to constrained areas. In some embodiments, the database is updated to include information on constrained areas that are expected to be presently relevant to negative passenger reactions. In some embodiments, constrained areas are manually identified and translated into map data and closed polygons to be stored in the database. In some embodiments, a machine learning model may be used to generate information that defines constrained areas. For example, text data from media sources may be obtained and parsed by a machine learning model to identify certain regions, countries, areas, zones, or the like that are discussed and to predict a likelihood that such regions, countries, areas, zones, or the like would cause negative passenger reactions. In some embodiments, survey or feedback data may be collected from passengers that describe negative preferences of the passengers.

Returning to FIG. 5, certain path estimations may intersect with constrained areas 510, and in some examples, these certain path estimations may intersect with constrained areas 510 due to a level of abstraction or estimation, such as path estimations that are great circle arcs between an origin and a destination or between a subset of waypoints. In some other examples, faithful path estimations, or path estimations that may generally be accurate with respect to the true route of the vehicle, may also intersect with constrained areas 510, and the navigation of the vehicle into a constrained area 510 may be unintended, erroneous, or the like.

Accordingly, technical solutions of this patent document involve the detection of intersections between paths (or estimations thereof) and constrained areas. In some embodiments, paths or path estimations are translated into map coordinates which are compared to map coordinates of a plurality of given constrained areas. In some embodiments, detecting the intersection of a path and a constrained area includes determining that a portion of the path is within a threshold distance from the constrained area.

Upon determination that a path intersects with a constrained area, the path may be updated such that the path does not intersect with the constrained area or other constrained areas. In some embodiments, a second non-intersecting path is determined based on a first path that is determined to intersect a constrained area. FIG. 5 illustrates one example result of updating an intersecting path or generating a non-intersection path. In particular, the path 500 shown in FIG. 5 circumvents the constrained area 510 along the border of the constrained area 510 (shown by a portion of the path 500 in dotted format) such that the path 500 is not shown to intersect across the constrained area 510. In some embodiments, the path 500 shown in FIG. 5 may be determined based on identifying two intersection points of an original or first path with the constrained area 510. A portion of the border defining the constrained area 510, the portion including one or more edges of a map overlay polygon or construct, that is between the two intersection points is used for the path 500. The two intersection points divides the border defining the constrained area 510 into two portions (e.g., there are two border segments by which one can reach a second intersection point from a first intersection point), and the border portion of the two border portions that has the shorter length may be selected to be a portion of the path 500. In some examples, the two border portions that are divided via the two intersection points may be approximately equal lengths, and a border portion that is furthest from a neighboring constrained area is selected for the path 500.

In the example of FIG. 5, a border portion extending along a southern portion of the constrained area 510 is selected for the path 500. Accordingly, the path 500 is determined to include a great circle arc segment between the origin 502 and a first intersection point, a portion of the border that surrounds the constrained area 510, and another great circle arc segment between the second intersection point and a destination 504. As a result, the path 500 is determined to circumvent and avoid the constrained area 510. The path 500 may then be displayed via IFE display devices to passengers with a reduced likelihood of passenger reactions due to misconceptions that the vehicle will be traveling through or is located within the constrained area 510. In some embodiments, although not explicitly illustrated in FIG. 5, the path 500 may circumvent or avoid the constrained area 510 with a segment that is parallel with the border portion and at a buffer distance away from the border portion. Thus, in contrast with the path estimation 20 in FIG. 1A, the path 500 in FIG. 5 accurately represents the circumvention of certain areas by the vehicle.

Figure 6:
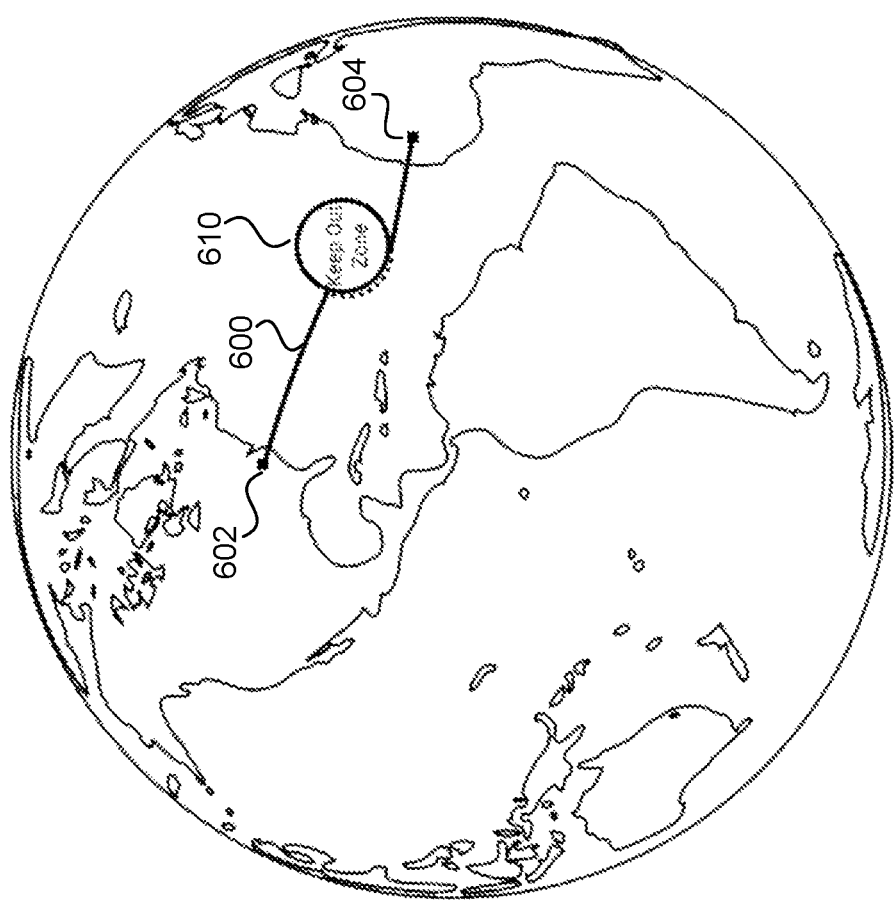
FIG. 6 shows another example of path information that is configured for passenger-oriented display.

FIG. 6 provides another example of a path that is constructed to avoid a constrained area 610. In particular, FIG. 6 illustrates a path 600 that represents a route, flight, mission, or the like of a vehicle between an origin 602 and a destination 604 and that avoids the constrained area 610, for example, so that negative passenger reactions to an indication that the vehicle travels through the constrained area 610 are precluded or minimized.

Similar to FIG. 5, a first path in FIG. 6 may be determined to intersect with the constrained area 610, prompting the construction of the path 600. Instead of including a portion that fully spans between two intersection points on the constrained area 610, the path 600 may include a shortened circumventing portion as illustrated. In some embodiments, the shortened circumventing portion of the path 600 (indicated in dotted format in FIG. 6) may span between an intersection point and a tangent point, or a point from which a straight path to a subsequent waypoint (e.g., a destination) can be defined without intersecting the constrained area 610 or other constrained areas. As shown in FIG. 6, the shortened circumventing portion spans between a first intersection point and a tangent point from which the destination 604 is visible or accessible via a straight path. Thus, in the illustrated example, the path 600 includes a first portion that is a great circle arc or straight path from the origin 602 to a first intersection point with the constrained area 610, the shortened circumventing portion from the first intersection point to a tangent point, and a great circle arc or straight path from the tangent point to the destination 604. In other examples, an example path may span from a preceding waypoint (e.g., an origin 602) to a tangent point, from the tangent point to an intersection point, and from the intersection point to a subsequent waypoint (e.g., a destination 604).

Figure 7:
FIG. 7 shows another example of path information that is configured for passenger-oriented display.

FIG. 7 provides another example of path information that is configured and provided for display to passengers of a vehicle. In FIG. 7, a path 700 approximately represents a route taken by a vehicle (e.g., an aircraft) between an origin 702 and a destination 704, and the path 700 for display may be determined in response to a determination that a first path estimation between the origin 702 and the destination 704 intersects with a constrained area 710. For example, as can be observed from FIG. 7, a great circle arc or a straight path estimation between the origin 702 and the destination 704 results in intersection with the constrained area 710.

Accordingly, in response to the determined intersection, path 700 is configured without intersecting the constrained area 710 (and/or other constrained areas) and may be provided for display via IFE displays for passenger viewing. In particular, the path 700 is configured based on additional waypoints that are used for navigation of the vehicle, for example, Waypoint 1 and Waypoint 2 indicated in FIG. 7. That is, while the first path estimation may only be based on straight paths between an origin and a destination, or between a limited subset of waypoints, the path 700 may be configured with a lower level of abstraction or estimation by including additional waypoints. Thus, in some embodiments, information related to additional waypoints may be obtained, and the information may include identifiers for the additional waypoints, coordinates for the additional waypoints, and a sequence order for the additional waypoints, for example. In an air travel application with commercial aircraft, waypoints or fixes may be identified with linguistic identifiers, and the IFEC system may be configured to reference a stored database for map coordinates associated with a waypoint identified with a given identifier or to request the map coordinates (e.g., from a ground server, from another system on-board the vehicle) for a waypoint identified with a given identifier.

The additional waypoints that are used for navigation of the vehicle may be presumed to be located outside of the constrained area 710 or any constrained areas, as the determined intersection of the first path estimation with the constrained area is understood to be an artifact of the estimation or abstraction. In some embodiments, however, an IFEC system may obtain the additional waypoints (e.g., from a ground server, from an avionics and navigation system of the vehicle) and may determine (e.g., verify) that the additional waypoints are not located within a constrained area. In this manner, the IFEC system may provide verification and backup capabilities for navigation of the vehicle whilst completing its path information display capabilities.

In some embodiments, the additional waypoints (e.g., Waypoint 1 and Waypoint 2) that are used to construct the path 700 are extracted from a plurality of waypoints indicated in planned path information for the vehicle. In some embodiments, the additional waypoints are extracted based on being located within a radius or a region of the constrained area 710. For example, based on determination of intersection between a first path estimation and a constrained area 710 at a given location or in a given region, additional waypoints that are located near the given location or in the given region are extracted from the planned path or route information. Thus, in some embodiments, a total number of waypoints used for the path 700 may be managed or minimized, for example, to satisfy various technical constraints of an IFEC system, such as data storage and processing constraints.

Alternative to the display of path 700 in response to a determined intersection of a first path estimation with the constrained area 710, path 700 or a path defined via an increased number of waypoints may be configured and provided for display by default. For example, in some embodiments, a minimum number of waypoints to be used for path estimation and displays thereof is determined such that paths spanning through at least the minimum number of waypoints are likely to not intersect with any constrained areas. In other embodiments, the path 700 may be configured and provided in response to a determination that a significant number of constrained areas are present in a region that includes the origin 702 and the destination 704, or similarly, a determination that constrained areas cover an area greater than a threshold within a given region. In such example scenarios then, path estimations for passenger display may rely upon actual navigation of the vehicle to a greater extent based on the presumption that the navigation of the vehicle has not planned to travel through constrained areas.

Figure 8:
FIG. 8 shows another example of path information that is configured for passenger-oriented display.

FIG. 8 shows passenger-oriented path information that may be configured and provided for passenger viewing. As shown, FIG. 8 includes a primary path 800 between an origin 802 and a destination 804. FIG. 8 further includes a plurality of secondary or connecting paths 820 that may be provided for display via an IFE display for a passenger. Each secondary or connecting path 820 spans between the destination 804 of the primary path 800 to a secondary destination 824 and may represent routes, flights, missions, or the like of the vehicle and/or other vehicles. In one application, the secondary or connecting paths 820 represent available routes, flights, missions, or the like of the vehicle and/or other vehicles that are planned for some time after the vehicle (and the passengers) reaches the destination 804 and that are available for the passengers of the vehicle.

In some embodiments, the secondary or connecting paths 820 shown in FIG. 8 are determined based on the IFEC system obtaining planned path information for multiple vehicles (e.g., vehicles of an airline). In some embodiments, the IFEC system obtains planned path information for routes, flights, or missions departing from the destination 804 prior to take-off of the vehicle, and the IFEC system may be configured to provide the secondary or connecting paths 820 for display throughout the duration of the travel of the vehicle. In other embodiments, the IFEC system is configured to periodically obtain planned path information for determining the connecting paths 820 while the vehicle is in travel, for example, via satellite communication with a ground server, via direct communication with a ground server, or via communication with other aircraft. Accordingly, with up-to-date planned path information, the IFEC system may dynamically determine the connecting paths 820 and update the connecting paths 820 for display as needed as the vehicle is in travel.

Each of the primary path 800 and the connecting paths 820 may be configured to minimize a likelihood of negative passenger reactions, in accordance with embodiments described herein. For example, it may be determined whether each of the primary path 800 and the connecting paths 820 intersect with a constrained area. Upon determination of an intersection, the primary path 800 or a connecting path 820 may be updated to circumvent or avoid the intersected constrained area in accordance with embodiments described with FIGS. 5, 6, and 7.

In some embodiments, the passenger-oriented path information shown in FIGS. 5-8, or path information configured for passenger viewing, may be provided for display via devices associated with passengers of the vehicle. For example, as shown in FIG. 1B, IFE displays 106 may each be associated with one or more passengers of the vehicle, and the passenger-oriented path information may be communicated to the IFE displays 106 via wireless communication (e.g., via wireless access points 120) or via wired connections. As another example, passengers may operate personal devices (e.g., smartphones, laptops, tablets, communication devices, personal entertainment devices) that may be in connection with an IFEC system of the vehicle (e.g., via wireless access point 120, via connection with IFEC seatback devices), and personal devices of passengers may receive the passenger-oriented path information for display.

In some embodiments, the passenger-oriented path information shown in FIGS. 5-8 may further include an indication or representation of a current vehicle location. For example, while path information shown in FIGS. 5-8 may holistically represent the route or flight of a vehicle between an origin and a destination, passengers may desire to be informed as to the progress of the route or flight along the displayed path. Accordingly, in some embodiments, the IFEC system may be configured to obtain a current or present location of the vehicle. For example, the IFEC system may receive the current or present location of the vehicle from an avionics and navigation system on-board the vehicle, or a system used by vehicle operators to operate the vehicle. In another example, the IFEC system may receive a current or present location of the vehicle from a ground server, where the current or present location of the vehicle is determined or estimated based on global satellite positioning techniques.

To represent the current location of the vehicle in a graphical display along with a determined path (e.g., path 500 in FIG. 5, path 600 in FIG. 6, path 700 in FIG. 7), the current location of the vehicle may be mapped onto the determined path. For example, in some instances, the current location may not be exactly co-located with a point on the determined path due to a level of estimation or abstraction present in the determined path. Accordingly, a point along the determined path that is nearest to the current location may be determined; for example, the current location of the vehicle may be perpendicularly projected to the determined path. In another example, the determined path may span between a sequence of consecutive waypoints, and the current location of the vehicle may be represented by an indication located at the waypoint nearest the current location.

In some embodiments, the current location of the vehicle may be requested by the IFEC system and represented in graphical display according to a configurable frequency. In other embodiments, to minimize cross-communication between the IFEC system and other systems on-board the vehicle, the current location of the vehicle may be extrapolated and represented by the IFEC system. For example, the IFEC system may obtain information that generally represents an average travel speed of the vehicle, and the IFEC system represents a location of the vehicle along a displayed path according to the average travel speed and an elapsed time.

Figure 9:
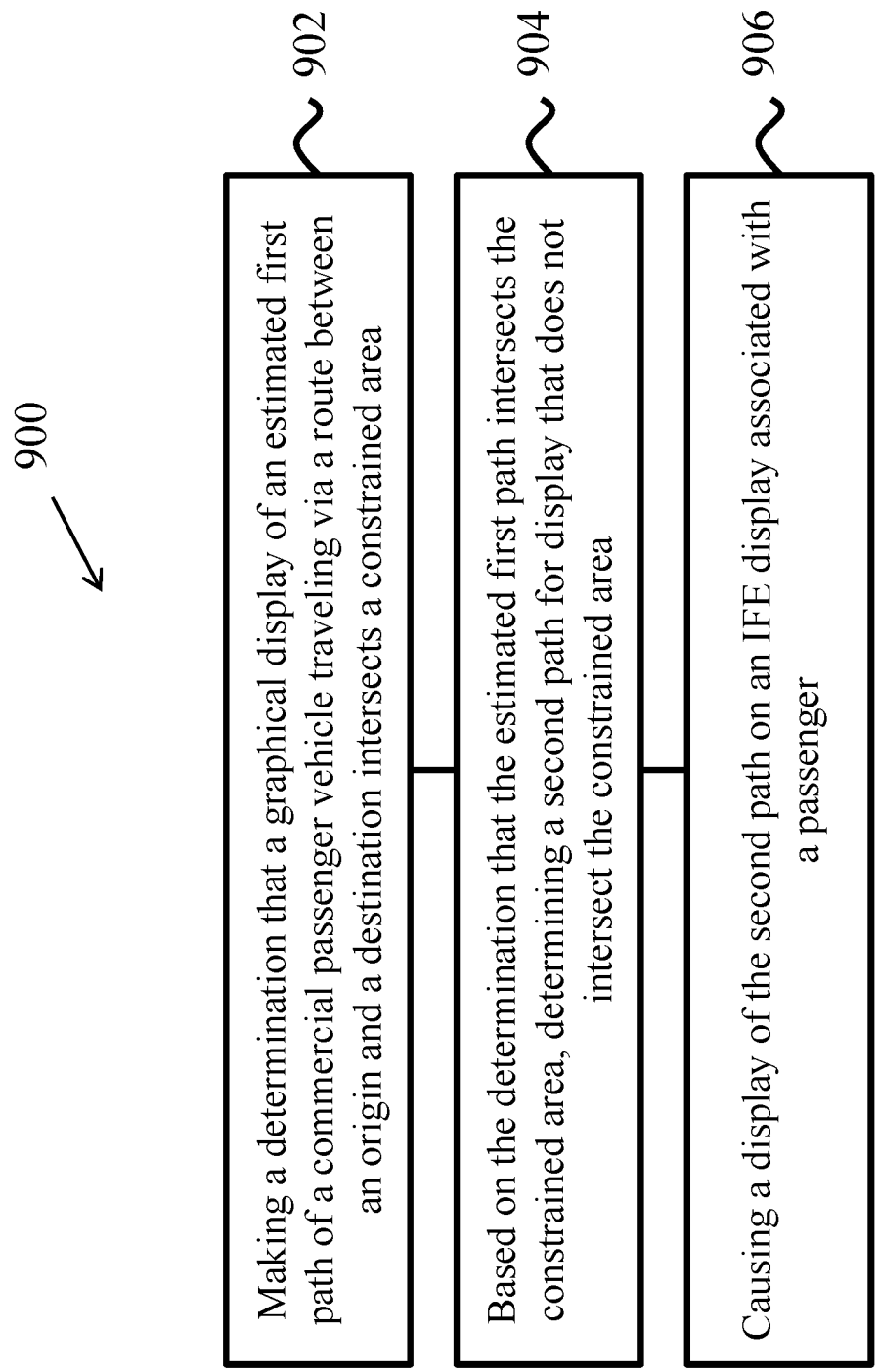
FIG. 9 is a flowchart for an example method of providing for display path information that is expected to minimize negative passenger reaction.

FIG. 9 shows a flowchart of an example method 900 for determining and providing for display passenger-oriented path information, including paths for display that do not intersect with constrained areas expected to induce negative passenger reactions. In some embodiments, operations of the method 900 may be implemented and/or performed by an IFEC system on-board a vehicle (e.g., the server 122 in FIG. 1B), by multiple integrated display devices associated with passengers of the vehicle, by avionics and navigation systems on-board a vehicle and in communication with an IFEC system, by a ground server, or by personal devices associated with a passenger and in communication with an IFEC system of the vehicle. Various technical benefits may be enjoyed through the implementation and/or performance of the method 900, including minimizing a likelihood of negative passenger reactions and thereby minimizing communication channel bandwidth occupancy between passengers and operators and minimizing distractions for vehicle operators.

At an operation 902 of the method 900, a determination that a graphical display of an estimated first path of a commercial passenger vehicle intersects a constrained area is made. The graphical display of the estimated first path of the commercial passenger vehicle represents the travel of the commercial passenger vehicle via a route between an origin and a destination. The estimated first path is estimated as a straight-line path between consecutive waypoints along the route. In some embodiments, the consecutive waypoints are the origin and the destination, and the straight-line path is graphically displayed as a great circle arc overlaid on a spherical map.

In some embodiments, the determination of the intersection with the constrained area is based on obtaining information that defines the constrained area. For example, the information may be obtained from an avionics and navigation system of the commercial passenger vehicle, or a system used for operating the vehicle and may be associated with limited access by vehicle operators. As another example, the information may be obtained from a ground server (e.g., via communication paths described in the context of FIGS. 3 and 4). As another example, information defining constrained areas may be obtained based on user input received via devices associated with passengers of the vehicle, including IFE display devices, personal devices, and the like.

At an operation 904 of the method 900, a second path for display is determined based on the determination made in operation 902. In particular, the second path for display does not intersect the constrained area and is determined based on the determination that the estimated first path intersects the constrained area. In some embodiments, the second path for display is determined based on determining a circumventing portion that avoids the constrained area and using the circumventing portion for the second path. For example, FIGS. 5 and 6 illustrate example circumventing portions that, along with original straight-line segments of the estimated first path, constitute the second path. As another example, FIG. 7 illustrates an example second path for display that is determined based on additional waypoints added to the consecutive waypoints from which the estimated first path is estimated.

At an operation 906 of the method 900, display of the second path on an IFE display associated with a passenger is caused. In some embodiments, the display of the second path includes display of a great circle arc on a spherical map projected onto the IFE display. In some embodiments, the display of the second path is caused in response to user input. For example, a menu or home screen may be displayed on the IFE display, and the passenger may provide user input indicating a request for path information to be displayed. Accordingly, operations of the method 900 may be performed based on receiving such a request via user input. In some embodiments, the display of the second path may be dynamically updated to indicate a current vehicle location along the second path. In some embodiments, display of the second path is additionally caused on personal display devices associated with the passenger, such as a mobile communication device, a laptop, a tablet, or the like.

In some embodiments, the method 900 may further include operations related to receiving information that indicates one or more connecting routes that originate from the destination, determining an estimated path for display for each of the one or more connecting routes, and causing display of the estimated path for each of the one or more connecting routes on the IFE display associated with the passenger.

It will be appreciated by one of skill in the art that various embodiments described herein introduce various benefits including those discussed herein and beyond. Entertainment systems that may implement embodiments described herein offer passengers with an unparalleled cinema-grade 4K organic light emitting diode (OLED) experience, used by passengers to view entertainment as well as personally curated path displays. Generally, entertainment systems in accordance with this document achieve a powerful and targeted way of engaging with passengers, and from the airline perspective, benefits including faster on-wing upgrades and maintenance, commonality in media loading, spares and repairs, and significant weight reductions compared to other seat-end architectures. In some embodiments, entertainment systems feature a cinema-grade 4K OLED with High Dynamic Range (HDR) experience. With perfect blacks and cinematic colors in its palette, OLED technology is widely regarded as the ultimate in display quality. With 22-inch screens, 13-inch screens, or similar, passengers can immerse themselves in stunning visuals that are even further enhanced with HDR for the absolute best possible home theater experience. According to some embodiments of this document, entertainment systems provide high-fidelity audio, delivering high-definition sound over both traditional wired connections and also via Bluetooth connections. The monitor of example entertainment systems is a singular design featuring gentle curve and soft rounded touchpoints. It also offers programmable LED lighting that enables airlines to optimize the cabin environment to complement various phases of flight with animated sequences synchronized to improve the passenger experience and reduce eye strain. In addition to enhancing passenger experience due to the high quality of display, the embodiments disclosed herein also mitigate any passenger fears or concerns by customizing travel path displays to passenger preferences and by avoiding display of constraint areas as disclosed herein.

In example embodiments, a removable peripheral bar ensures that disclosed entertainment systems can easily evolve to allow passengers to interact with the system over time. This feature may also be used by passengers to customize flight path display to their preference as disclosed throughout the present document. Passengers will always be able to fast charge their devices with USB power even if new power requirements are introduced. In addition, this key feature means that passengers will be able to connect headphones or devices even if Bluetooth technologies or standards change. Via example entertainment systems, passengers can also stay in touch with their friends and family around the world by using on-board Wi-Fi, GSM, and cellular communication services.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus. Depending on the type of a commercial passenger vehicle different constraints areas may be used during implementations.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc. In some embodiments, the methods may be stored in the form of computer-executable instructions that are stored on a computer-readable medium. Alternatively, or in addition, cloud-based computing resources may be used for implementing the embodiments.

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. An entertainment system of a commercial passenger vehicle, the entertainment system comprising:
   a plurality of display devices associated with passengers of the commercial passenger vehicle;
   a constrained area supervisor configured to (i) determine that a first estimation of a route traveled by the commercial passenger vehicle intersects a constrained geographic area between an origin and a destination of the route, wherein the first estimation comprises one or more straight-line paths between consecutive waypoints including the origin and the destination of the route, and (ii) based on the determination that the first estimation of the route intersects the constrained geographic area, output a second estimation of the route that does not intersect the constrained geographic area; and a passenger personalization platform cooperating with the constrained area supervisor to cause graphical display of the second estimation of the route instead of the first estimation of the route on a particular display device of the plurality of display devices that is associated with a particular passenger.

2. The entertainment system of claim 1, wherein the entertainment system further comprises a display manager configured to work in cooperation with the passenger personalization platform and the constrained area supervisor, wherein the display manager is configured to communicate a display image to a graphics buffer of the particular display device, wherein the display image comprises a first layer of map image data and a second layer of an indication along the second estimation of the route that is representative of a current location of the commercial passenger vehicle along the route.

3. The entertainment system of claim 2, wherein the first layer of map image data includes a spherical map, and wherein at least a portion of the second estimation of the route is graphically displayed as a great circle arc on the spherical map.

4. The entertainment system of claim 1, wherein the passenger personalization platform obtains information that defines the constrained geographic area from an avionics and/or a navigation system of the commercial passenger vehicle.

5. The entertainment system of claim 1, wherein the passenger personalization platform obtains, via a ground server, information that defines the constrained geographic area from a database that stores information defining a plurality of constrained geographic areas based on an expectation of a negative reaction from the particular passenger in response to a display of the commercial passenger vehicle being located within the constrained geographic area.

6. The entertainment system of claim 1,
wherein the first estimation of the route intersects the constrained geographic area at a first intersection point and a second intersection point, and
wherein the second estimation of the route includes a portion of a border that surrounds the constrained geographic area, the portion of the border being between the first intersection point and the second intersection point.

7. The entertainment system of claim 1, wherein outputting the second estimation of the route comprises determining the second estimation of the route based on determining a minimum distance along a border that surrounds the constrained geographic area that allows a straight-line path to connect to a subsequent waypoint along the route.

8. The entertainment system of claim 1, wherein outputting the second estimation of the route comprises determining the second estimation of the route based on:
receiving information that indicates a plurality of navigation waypoints along the route, the plurality of navigation waypoints being located outside of the constrained geographic area;
determining corresponding map coordinates for each of the plurality of navigation waypoints; and
determining the second estimation of the route to include straight-line paths between the consecutive waypoints along the route and the plurality of navigation waypoints.

9. A method for providing route information implemented in an entertainment system of a commercial passenger vehicle, the method comprising:
initiating and regulating, by a constrained area supervisor of the entertainment system, a display on one or more entertainment displays;
making a determination, by the constrained area supervisor, that a graphical display of a first estimation of a route traveled by the commercial passenger vehicle intersects a constrained geographic area between an origin and a destination of the route,
wherein the determination is made by the constrained area supervisor based on cooperating with a passenger personalization platform of the entertainment system, and
wherein the first estimation of the route comprises one or more straight-line paths between consecutive waypoints along the route including the origin and the destination of the route;
based on the determination that the first estimation of the route intersects the constrained geographic area, determining, by the constrained area supervisor, a second estimation of the route lacking an intersection with the constrained geographic area; and
causing, by the constrained area supervisor, a display of the second estimation of the route instead of the first estimation of the route on an entertainment display associated with a particular passenger.

10. The method of claim 9, wherein cooperating with the passenger personalization platform comprises the passenger personalization platform obtaining information that defines the constrained geographic area from an avionics and/or a navigation system of the commercial passenger vehicle.

11. The method of claim 9, wherein cooperating with the passenger personalization platform comprises the passenger personalization platform obtaining, via a ground server, information that defines the constrained geographic area from a database that stores information defining a plurality of constrained geographic areas based on an expectation of a negative reaction from the particular passenger in response to a display of the commercial passenger vehicle being located within the constrained geographic area.

12. The method of claim 9, wherein cooperating with the passenger personalization platform comprises the passenger personalization platform obtaining information that defines the constrained geographic area based on user input received at the entertainment display associated with the particular passenger.

13. The method of claim 9,
wherein the first estimation of the route intersects the constrained geographic area at a first intersection point and a second intersection point, and
wherein the constrained area supervisor determines the second estimation of the route to include a portion of a border that surrounds the constrained geographic area, the portion of the border being between the first intersection point and the second intersection point.

14. The method of claim 9, wherein determining the second estimation of the route comprises determining a minimum distance along a border that surrounds the constrained geographic area that allows a straight-line path to connect to a subsequent waypoint along the route.

15. The method of claim 9, wherein the constrained area supervisor determines the second estimation of the route based on:

receiving information that indicates a plurality of navigation waypoints along the route, the plurality of navigation waypoints being located outside of the constrained geographic area;

determining corresponding map coordinates for each of the plurality of navigation waypoints; and determining the second estimation of the route as an estimated straight-line path between the consecutive waypoints along the route and the plurality of navigation waypoints.

16. The method of claim 15, wherein the corresponding map coordinates are determined based on receiving, in response to a request, information that includes the corresponding map coordinates from an avionics and/or navigation system of the commercial passenger vehicle or a ground server.

17. The method of claim 9, further comprising causing, by the constrained area supervisor, a display of an indication along the second estimation of the route that is representative of a current location of the commercial passenger vehicle along the route.

18. The method of claim 9, wherein causing display of the second estimation of the route comprises causing display of at least a portion of the second estimation of the route as a great circle arc on a spherical map projected on to the entertainment display.

19. The method of claim 9, further comprising:

receiving information that indicates one or more connecting routes that originate from the destination;

determining respective estimations of the one or more connecting routes; and causing display of the respective estimations of the one or more connecting routes on the entertainment display associated with the particular passenger.

20. An information display system embedded in a commercial passenger vehicle, the information display system comprising:

a display manager configured to:
- obtain a virtual path for display that (i) represents a route between an origin and a destination travelled by the commercial passenger vehicle and (ii) is configured to, when displayed, not intersect a constrained geographic area between the origin and the destination, and
- provide path information for the virtual path to one or more display devices associated with a passenger of the commercial passenger vehicle for graphical display based on a relationship between the passenger and the constrained geographic area;

a passenger personalization platform cooperating with the display manager to provide the relationship between the passenger and the constrained geographic area; and a path display interface via which a first layer of map image data and a second layer of the path information are provided to the one or more display devices associated with the passenger for graphical display.

* * * * *